[19] United States Patent
Wang

[11] Patent Number: 5,551,536
[45] Date of Patent: Sep. 3, 1996

[54] PAD SUPPORT FOR DISC BRAKE ASSEMBLY

[75] Inventor: Nui Wang, Croydon, Australia

[73] Assignee: Brake and Clutch Industries Australia Pty. Ltd., Victoria, Australia

[21] Appl. No.: 374,996

[22] Filed: Jan. 18, 1995

Related U.S. Application Data

[63] Continuation of Ser. No. 917,144, Aug. 9, 1992, abandoned.

[30] Foreign Application Priority Data

Dec. 10, 1990 [AU] Australia ................. PK3810

[51] Int. Cl.⁶ ................. F16D 65/02; F16D 65/095
[52] U.S. Cl. ................. 188/73.31; 188/73.43
[58] Field of Search ................. 188/71.1, 73.1, 188/73.31, 369–70, 73.43, 73.47

[56] References Cited

U.S. PATENT DOCUMENTS

| 2,944,637 | 7/1960 | Knowles | 188/72.5 |
| 2,948,356 | 8/1960 | Butler | 188/73.47 X |
| 3,005,522 | 10/1961 | Butler | 188/73.47 X |
| 3,417,843 | 12/1968 | Trollope | 188/170 |

FOREIGN PATENT DOCUMENTS

| 5714180 | 3/1981 | Australia. |
| 0268095 | 5/1988 | European Pat. Off.. |
| 1089618 | 10/1954 | France. |
| 1368280 | 6/1964 | France. |
| 2487770 | 2/1982 | France. |
| 1600120 | 1/1970 | Germany. |
| 1680832 | 7/1971 | Germany. |
| 3208910 | 11/1982 | Germany. |
| 989237 | 4/1965 | United Kingdom. |
| 1456004 | 11/1976 | United Kingdom. |
| 2096257 | 10/1982 | United Kingdom. |

Primary Examiner—Josie Ballato
Attorney, Agent, or Firm—Watson Cole Stevens Davis P.L.L.C.

[57] ABSTRACT

A disc brake assembly (1) of the kind including a caliper (6) and two pad assemblies (3, 4), each of which is operable to engage a respective opposite side of a brake disc (5) when the brake assembly is installed on a vehicle. The caliper includes a housing (8) having a cylinder formed therein, and a piston which carries one of the pad assemblies (3) is slidable within that cylinder. The caliper (6) also has a bridge (7) which is connected to the housing (8) and which carries the other pad assembly (4). A mounting arm (12, 13) extends generally transverse relative to the axis of the caliper cylinder and is deflectable relative to the associated support (2) in the general direction of that axis so as to allow the pad assemblies (3, 4) to move towards and away from their respective adjacent sides of the disc (5). The arm (12, 13) is resistant to deflection however, in at least one direction transverse to the cylinder axis and functions to hold the aforementioned combination in an operative position relative to the disc (5) when in use.

20 Claims, 5 Drawing Sheets

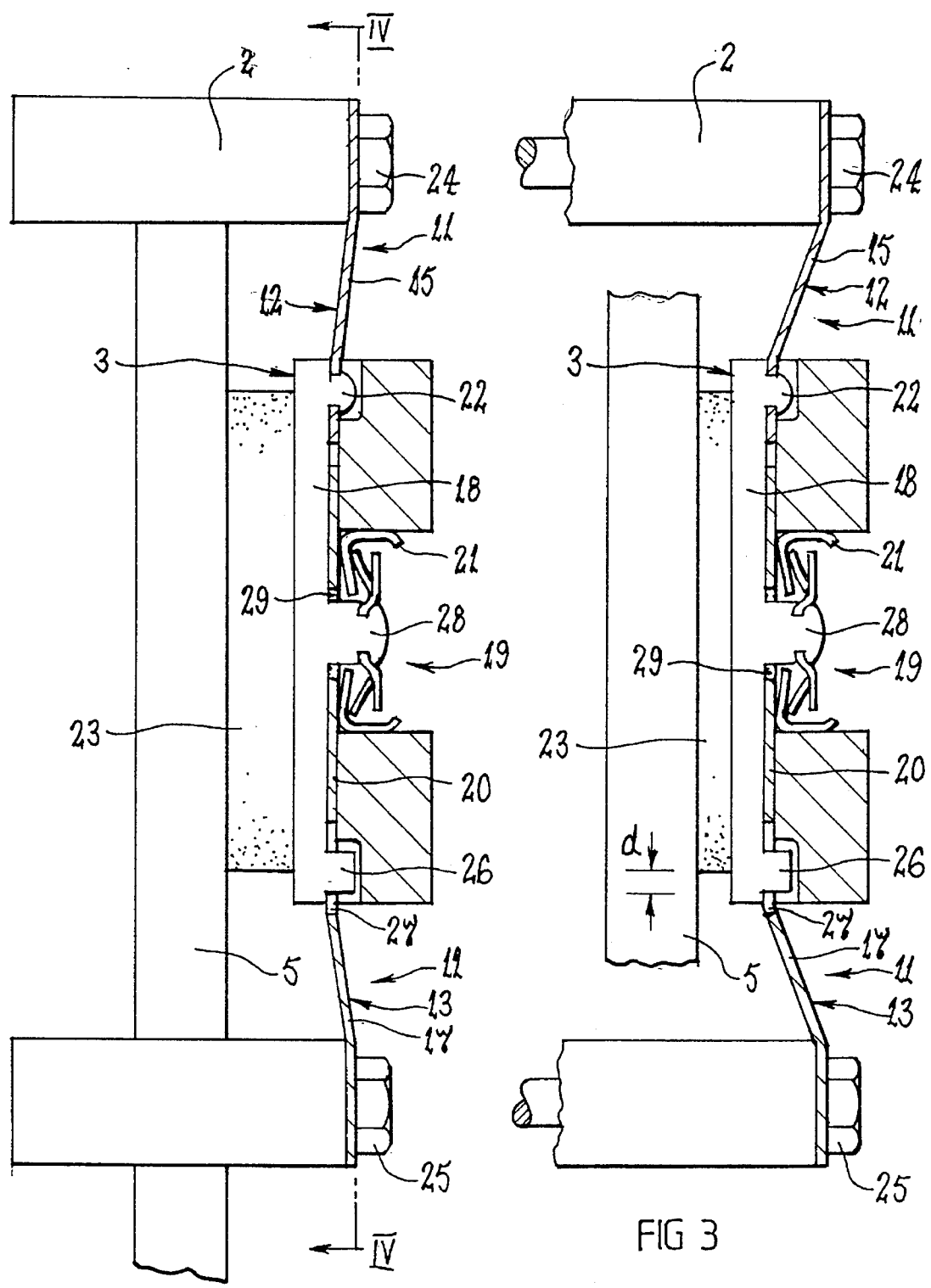

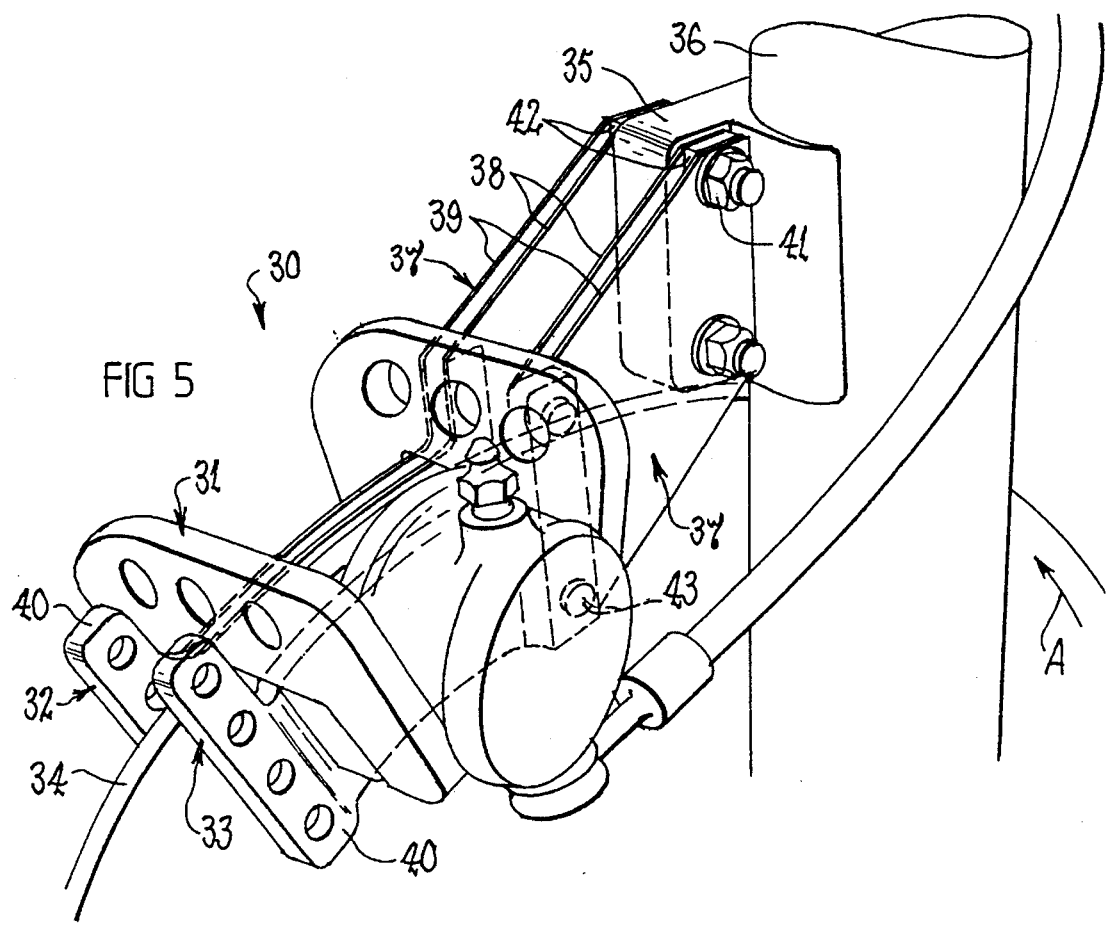
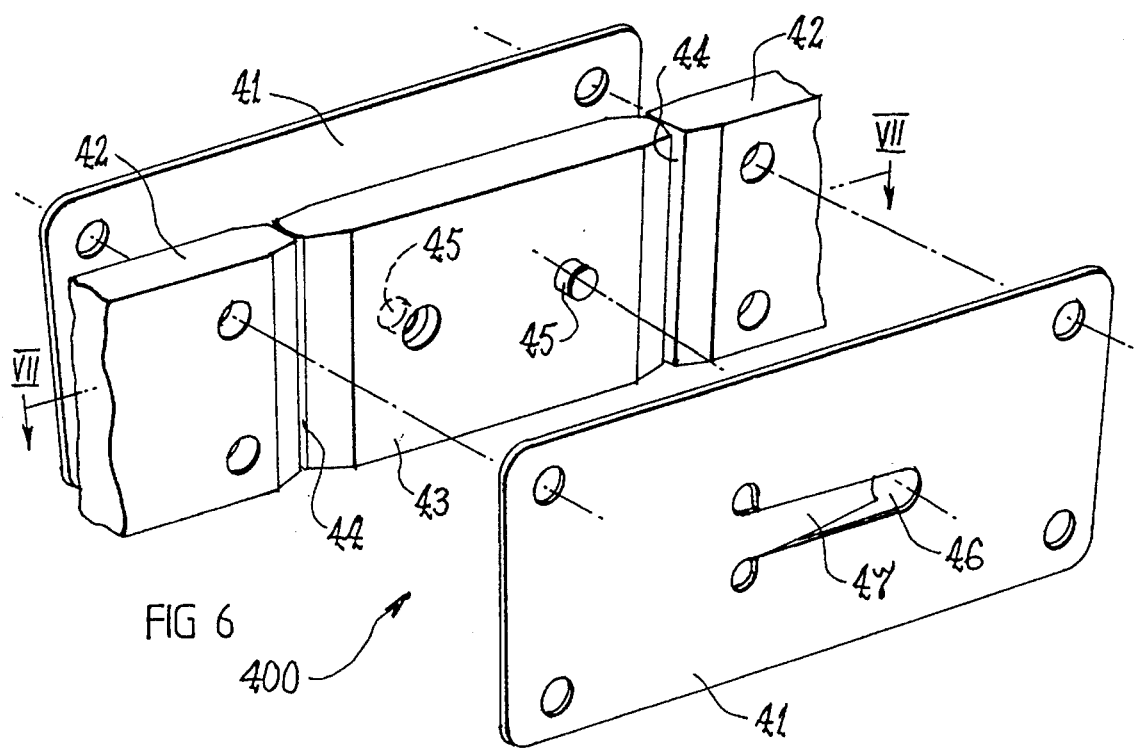

PAD SUPPORT FOR DISC BRAKE ASSEMBLY

This application is a Continuation of application Ser. No. 07/917,144, filed Aug. 9, 1992 now abandoned.

This invention relates to a disc brake assembly and more particularly to the manner in which the brake pads and caliper of a disc brake assembly are mounted relative to a vehicle on which the assembly is located.

There are various different prior arrangements whereby the forces applied to the disc brake pads under braking are transmitted to the vehicle on which the brake assembly is mounted. One prior arrangement, known as a pin guided system, employs an anchor bracket on which a pair of parallel pins are mounted, the pins being aligned parallel with the rotational axis of the disc. The brake pads or the caliper slide on the pins during engagement or disengagement of the brake such that the braking forces are transmitted to the anchor bracket. Another prior arrangement, known as a pad guided system, employs an anchor bracket which is mounted on the vehicle and has a pair of parallel slideways formed thereon. The pads have lugs which engage in the slideways and permit the pads to slide towards and away from the disc as the brakes are applied and released. The anchor bracket serves as a reaction block against which the pads bear when the brakes are applied.

Those prior arrangements suffer a number of disadvantages. Firstly, the anchor brackets must be of a reasonably substantial construction to withstand the forces being applied to them, and accordingly tend to be heavy and costly items. Secondly, disc brake assemblies generally employ a biasing spring or anti-rattle spring between the pads or caliper and the anchor bracket. The biasing springs on larger brake assemblies need to apply a large bias force if they are to be effective, but the increased bias force compromises the pad slide capability. Thirdly, it is known for brake pads to seize on their slideways or guide pins, and that can result in a dangerously inadequate brake performance and uneven pad wear.

It is an object of this invention to provide a disc brake assembly which avoids the need for an anchor bracket of the type used heretofore. A further object of the invention is to provide a less expensive brake assembly. A still further object of the invention is to provide a brake assembly which, at least under some conditions, is safer than those used heretofore.

Yet another object of the invention is to provide an improved pad assembly for use in a disc brake assembly. Still another object of the invention is to provide an improved caliper for use in a disc brake assembly.

According to one aspect of the present invention, there is provided a disc brake assembly including, a rotatable disc, a brake pad located on each of two opposite sides of the disc, a support located away from said pads in a direction transverse to the rotational axis of the disc, and mounting means connecting said pads to said support and having an arm which extends between the pads and the Support and holds the pads in an operative position relative to said support, wherein said arm is deflectable in the general direction of said axis to thereby permit each said pad to move towards and away from the respective adjacent side of the disc, and said arm is substantially resistant to deflection in at least one direction transverse to said axis such that the pads are not caused to be moved out of said operative position by the load imposed on said arm as a consequence of said pads engaging the disc while the disc is rotating.

It is to be understood that the operative position of the pads is a position which is at a fixed distance from the disc axis and is also at a fixed distance from the support to which the mounting arm is connected. It is a position such that the pads are able to function as required, and movement of the pads towards and away from the disc does not involve a change in that position. In order to achieve efficient braking, the operative position needs to be fixed in the sense that when the pads are engaged with the rotating disc they do not move with that disc. The aforementioned resistance to deflection is intended to achieve that objective. In particular, the mounting arm needs to be resistant to bending, buckling or stretching under the load imposed on that arm by the braking forces which are generated when the pads are engaged with the rotating disc.

In some situations, the brake is only required to retard movement of the disc in a forward direction of rotation, whereas in other situations it will be required to retard movement in both forward and reverse directions of rotation. The potential for the mounting arm to deflect under braking load will be different in each of those situations, so that the arm needs to be designed accordingly. The position of the associated support will also influence the design of the arm. By way of example, the arm will need to be designed to resist deflection under tension if the support is located rearward of the pads relative to the direction of rotation of the disc. The arm will need to resist deflection under compression if it is located forward of the pads, and it will need to resist bending if it extends generally radially of the disc axis.

If the brake is to be used to retard disc rotation in both forward and rearward directions, it may be appropriate to have two mounting arms which are connected to respective supports and which extend in generally opposite directions from the pads. Such a double arm arrangement allows the arms to be designed to have minimum resistance to deflection under compression, since a respective one of the arms will be under tension in each of the two directions of rotation of the disc.

According to a further aspect of the invention, there is provided a pad assembly for use with a disc brake, including a backing plate, a friction pad secured to said plate, and at least one mounting arm connected to said plate and extending laterally therefrom for connection to a support, wherein said arm is deflectable in a direction such that the pad can be moved relative to said support towards and away from a brake disc with which the pad assembly is used, and said arm is substantially resistant to deflection in at least one direction transverse to the first said direction.

According to yet another aspect of the invention, there is provided a caliper for use with a disc brake assembly, including a housing containing a cylinder for slidably receiving a piston having a first friction pad assembly attached thereto, a bridge connected to said housing so as to extend generally in the direction of the cylinder axis and being attached to a second friction pad assembly, and at least one mounting arm connected to said housing and extending therefrom in a direction generally transverse to said axis, wherein said arm is deflectable in the general direction of said axis and is substantially resistant to deflection in at least one direction transverse to said axis.

According to still another aspect of the invention, there is provided a disc brake assembly including, a braking unit comprising a caliper and two pad assemblies, said caliper including a housing and a bridge connected to said housing, a cylinder formed within said housing, a piston slidably contained in said cylinder and having one of said pad assemblies attached thereto, the other said pad assembly being attached to said bridge so as to be in opposed relationship to the first said pad assembly, and a mounting arm connected to said braking unit and extending laterally therefrom in a direction transverse to the axis of said cylinder, wherein said arm is connectable to a support at its end remote from said unit and is deflectable relative to said support in the general direction of said cylinder axis to allow said pad assemblies to move towards and away from respective opposite sides of a brake disc with which they are associated in use, and said arm is resistant to deflection in at least one direction transverse to said cylinder axis and functions in use to support said unit at an operative position relative to said support and said disc.

Embodiments of the invention are described in detail in the following passages of the specificaton which refer to the accompanying drawings. The drawings, however, are merely illustrative of how the invention might be put into effect, so that the specific form and arrangement of the various features as shown is not to be understood as limiting on the invention.

In the drawings:

FIG. 2 is a part sectioned diagrammatic view showing an arrangement similar to that shown in FIG. 1 with the outboard brake pad assembly being omitted for convenience of illustration.

FIG. 3 is a view similar to FIG. 2 but showing the brake pad in a worn condition.

FIG. 5 shows another embodiment of the invention as applied to a motorcycle brake.

FIG. 6 shows, in perspective view, a mounting arm or strap for a brake pad assembly, according to one embodiment of the invention.

Figure 1:
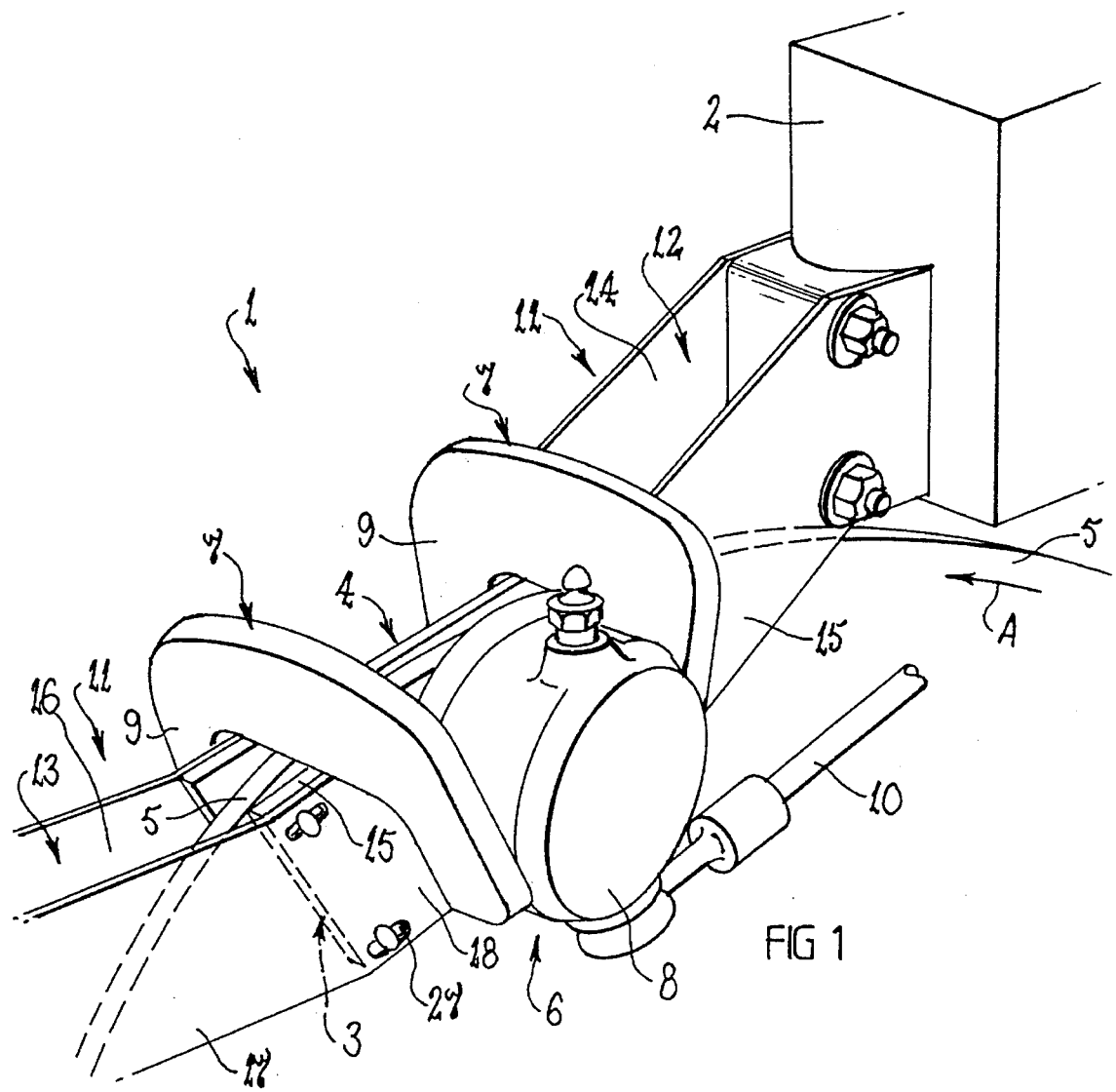
FIG. 1 is a semi-diagrammatic perspective view of an example embodiment of the invention applied to one particular form of vehicle brake.

The disc brake assembly 1 shown in FIG. 1 is mounted on a support member 2 which forms part of a motor vehicle (not shown). The brake assembly 1 includes an inboard friction pad assembly 3 and an outboard friction pad assembly 4 which are located on respective opposite sides of a disc or rotor 5 which is connected to a wheel (not shown) of the vehicle. The brake assembly 1 also includes a caliper 6 having a bridge 7 and a housing 8 for a cylinder which slidably receives a piston (not shown). Fingers 9 on the outboard side of the caliper bridge 7 support the outboard pad assembly 4 and, the inboard pad assembly 3 is connected to the aformentioned piston. Hydraulic fluid under pressure is supplied to the cylinder through a supply line 10 when the brake pedal or lever of the vehicle is depressed, and thereby causes the brake to operate in a known manner.

The support member 2 is located away from the pad assembly 3 and 4 in a direction transverse to the rotational axis of the disc 5. Mounting means 11 connects the pad assemblies 3 and 4 to the support member 2, and that mounting means 11 has two important characteristics. First, the mounting means 11 allows the pad assemblies 3 and 4 to move towards and away from their respective adjacent sides of the disc 5 so that they can operate as required. Second, the mounting means 11 supports the pad assemblies 3 and 4 at an operative position which has a substantially fixed relationship with both the support member 2 and the rotational axis of the disc 5. Furthermore, that second characteristic is retained under the loads imposed when the brake is operated.

In the particular arrangement shown in FIG. 1, the mounting means 11 connects the pad assemblies 3 and 4 to both the support member 2 and another support member. The second support member is not shown, but is located on the side of the caliper 6 opposite to that adjacent the member 2. A mounting arm 12 connects the pad assemblies 3 and 4 to the support member 2, and a second mounting arm 13 connects those assemblies to the other support member.

The mounting arms 12 and 13 may be constructed in any appropriate fashion, bearing in mind the two characteristics previously referred to. In the example shown, the arm 12 is composed of two straps 14 and 15 of sheet metal or other suitable material, which are arranged in spaced face to face relationship. The outer end of each strap 14 and 15 is secured to the support member 2 in a suitable fashion, and the inner end of each is attached to the pad assemblies 3 and 4. That attachment may be effected by having the strap 14 attached to or formed integral with a backing plate of the pad assembly 4, and by having the strap 15 attached to or formed integral with a backing plate of the pad assembly 3. Other forms of attachment are possible as hereinafter explained.

Because of their sheet-like nature, the straps 14 and 15 are able to flex or deflect in the general direction of the rotational axis of the disc 5 and thereby permit appropriate braking and release movement of the pad assemblies 3 and 4. On the other hand, the straps 14 and 15 have a width such as to resist bending in the plane of their broad surfaces, and they also resist deflection (stretching) under tension.

Arrow A in FIG. 1 represents the forward direction of rotation of the disc 5, which is the direction under which braking is to be effected in the majority of circumstances. If the brake is applied while the disc 5 is rotating in the reverse direction, the straps 14 and 15 will be subjected to compressive forces, and would tend to deflect (buckle) under those circumstances if not for the influence of the arm 13. The arm 13 is subjected to tension under those circumstances and therefore takes the load of the braking effort.

The arm 13 as shown is constructed similar to the arm 12, and in particular includes two straps 16 and 17 arranged in spaced face to face relationship. Each of the straps 14, 15, 16 and 17, is preferably made from thin metal plate so as to have the ability to flex in a direction perpendicular to the plane of the disc 5. Generally, there will be a relatively small degree of movement of the pad assemblies 3 and 4 between the brake applied and brake released positions.

Figure 4:
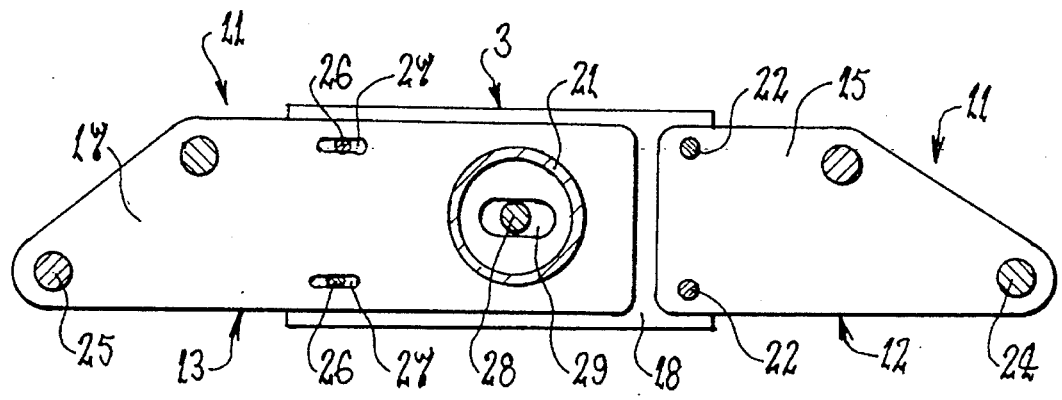
FIG. 4 is a cross-sectional view taken along line IV—IV of FIG. 2.

The friction pad of each pad assembly 3 and 4 will wear over a period of time, and the distance required to be travelled by each assembly 3 and 4 will be increased accordingly. For that reason it may be desirable to provide a slip joint at an appropriate place in the mounting means 11. FIGS. 2 to 4 depict one possible slip joint arrangement. As shown, the strap 15 on one side of the brake pad assembly 3 is fixed to the backing plate 18 of the assembly 3 by means of rivets 22. No relative movement between pad assembly 3 and the strap 15 is possible. The corresponding strap 17 of the arm 13 however, is connected to the brake pad assembly 3 by means of a slip joint 19. The strap 17 includes an end section 20 which extends parallel to the backing plate 18 and is held in position by a spring loaded pressure plate 21 which is retained on the backing plate 18 by means of a rivet 28.

The pressure plate 21 allows the strap end section 20 to slide relative to the backing plate 18. Other arrangements could be adopted to achieve the same result.

In order to avoid movement at the slip joint 19 when the brakes are operating, it is preferred that the coefficient of friction between the strap end section 20 and the backing plate 18 is greater than the coefficient of friction between the friction pad 23 of the assembly 3 and the disc 5. Thus, when the brakes are applied, the caliper 6 will press the strap end section 20 against the backing plate 18, and thereby also press the friction pad 23 against the disc 5. Since the disc/friction pad coefficient of friction is less than that of the strap end section/backing plate, the disc 5 will slip relative to the friction pad 23 rather than the backing plate 18 slipping relative to the end section 20. However, because the friction pad 23 may wear over time, it is desirable that the pad assembly 3 is able to move towards the disc 5, as depicted in FIG. 3. In order to enable that movement to occur, there needs to be movement at the slip joint 19 such that the effective length of the mounting means 11 is increased. In that regard, the effective length can be taken to be the length extending between the support connections 24 and 25.

It will be seen from FIG. 3 that because of the wear of the pad 23, it has moved a distance 'd' towards the support 2. The slip joint 19 has permitted that movement to occur. In that regard, the pressure plate 21 only holds the strap end section 20 to the backing plate 18 and does not prevent relative slipping. When the pad 23 wears as depicted in FIG. 3, the caliper 6 moves the pad assembly 3 towards the disc 5 prior to application of the brake, and the slip joint 19 provides the slack to permit that movement. When, however, the friction pad 23 contacts the disc 5, the caliper 6 will press the strap end section 20 hard against the backing plate 18 thereby preventing, as a result of the relatively high coefficient of friction between the backing plate 18 and the end section 20, further movement at the slip joint 19. Thus movement at the slip joint 19 will occur as necessary to compensate for pad wear, but will not occur while the brake is operating.

In the arrangement shown, the end section 20 is retained in position on the backing plate 18 by means of pins 26 which pass through elongate slots 27 extending parallel to the longitudinal axis of the strap 17. The slots 27 permit the movement of the brake pad assembly 3 towards the mount 2 as the friction pad 23 wears through use. The rivet 28 passes through a central elongate slot 29. The length of the slots 27 and 29 is selected such that the pad 23 is able to move towards the support 2 a distance which is sufficient to accommodate the full extent of wear of the friction pad 23.

The arm 12 is connected to the sides of the pad assemblies 3 and 4 which are in effect the leading sides of the two brake pads 3,4 when the vehicle to which the brake assembly is mounted is travelling in its normal forward direction. The straps 14 and 15 of the arm are therefore placed in tension when the brake is applied. The tensile force thus generated in the arm 12 is reacted into the support 2, and effective braking of the vehicle occurs. When the vehicle is travelling in reverse however the sides of the pad assemblies 3 and 4 connected to the arm 13 become the leading sides and the straps 16 and 17 are placed under tension, and the straps 14 and 15 are subjected to compression. The strap 16 and 17 therefore transmit the braking force necessary to slow the vehicle when the vehicle is travelling in reverse.

In cases where the mounting means 11 is connected to both ends of the brake pad assemblies 3 and 4 it is preferred that the straps on the leading side of the caliper 6 (whichever direction the vehicle is travelling) are solely responsible for holding the pad assemblies 3 and 4 in position for transmitting braking force to the vehicle. The straps on the trailing side will be under compression and they may buckle slightly. In vehicles such as motor cycles which generally require braking in one direction of travel only, it may be sufficient to have straps on one side only of the caliper 6. That side will be the leading side of the caliper 6 when the vehicle is travelling in its usual direction. FIG. 5 of the drawings shows a brake assembly of that type which is attached to the front fork of a motor cycle.

FIG. 5 shows a brake assembly 30 which includes a caliper 31 and inboard and outboard brake pad assemblies, 32 and 33 adapted to engage respective opposite sides of a disc 34 secured to a motor cycle wheel (not shown) for rotation therewith. The pad assemblies 32 and 33 are connected to a bracket 35 on the front fork 36 of the motor cycle by means of a mounting arm 37 which is composed of two inner straps 38 and two outer straps 39. Each brake pad assembly 32 and 33 is connected to the bracket 35 by means of an inner strap 38 and an outer strap 39, with the inner strap 38 attaching to the inner face of the backing plate 40, and the outer strap connecting to the outer face of the backing plate 40. The arm 37 is connected to the bracket 35 by means of bolts 41, and the straps 38 and 39 are held spaced apart at the bracket by spacers 42. The arm 37 is held to the brake pad assemblies 32 and 33 by rivets 43. The straps 38 and 39 are preferably made from thin metal plate and are sufficiently flexible to accommodate normal movement, back and forth, of the brake pad assemblies 32 and 33 under braking conditions. Also, as the friction pad wears down, the arm 37 will permit the pad assemblies 32 and 33 to move closer to the disc faces. It will be appreciated that as an alternative to having two straps for each pad assembly it will be possible to have a single, thicker strap connected to either the inner or outer face of the backing plate to provide for reverse braking.

In the event that reverse braking is required the composite effect of the more rigid strap arrangement for each pad assembly will enable the straps 37 to carry the compressive load of that reverse braking. It is envisaged that a motorcycle will only infrequently require reverse braking, such as to prevent the motor cycle moving backwards when it has stopped on a hill, and that the braking load thus applied will be relatively slight compared to that experienced under forward dynamic braking conditions. Other vehicles, such as go-carts and bicycles, may also advantageously employ straps on one side of the brake pads.

Figure 7:
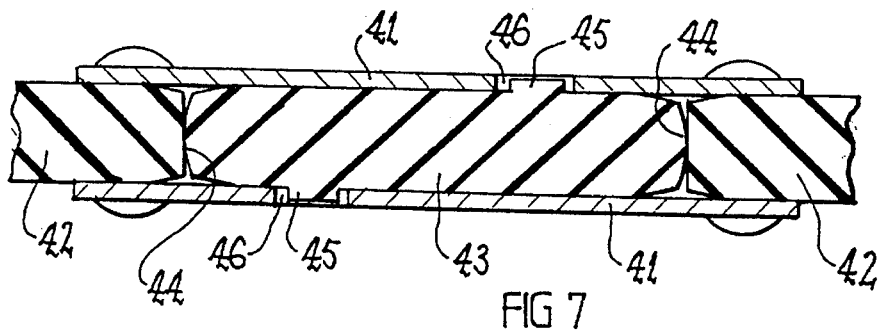
FIG. 7 is a cross-sectional view taken along VII—VII of FIG. 6.

FIGS. 6 and 7 show a relatively rigid strap 400 of the aforementioned kind. That strap 400 is composed of two outer plates 41, two abutments 42 and a compression member 43. Each of the two abutments 42 is secured to a respective end of the plates 41 in an appropriate manner, and those abutments 42 serve to retain the plates 41 in spaced apart face to face relationship. The abutments 42 are arranged to that their opposed ends 44 are spaced apart in the longitudinal direction of the strap 400.

The compression member 43 is interposed between the plates 41 and also between the abutment ends 44. Any suitable means may be employed to retain the member 43 in that location. In the arrangement shown, pins 45 projecting from the member 43 locate in apertures formed in the outer plates 41. It is also preferred, as shown, that at least one of the plates 41 has a flexible finger 47 which bears against the member 43 so as to minimize rattle or vibration.

When the strap 400 is under tensile load, it functions in the manner previously described and the compression member 43 serves no real purpose. If the strap 400 is subjected to endwise compression however, the plates 41 buckle slightly and the member 43 is engaged with each of the abutment ends 44. The abutments 42 and the member 43 then combine to form a rigid section which resists deflection of the arm 400 under compressive load.

Figure 8:
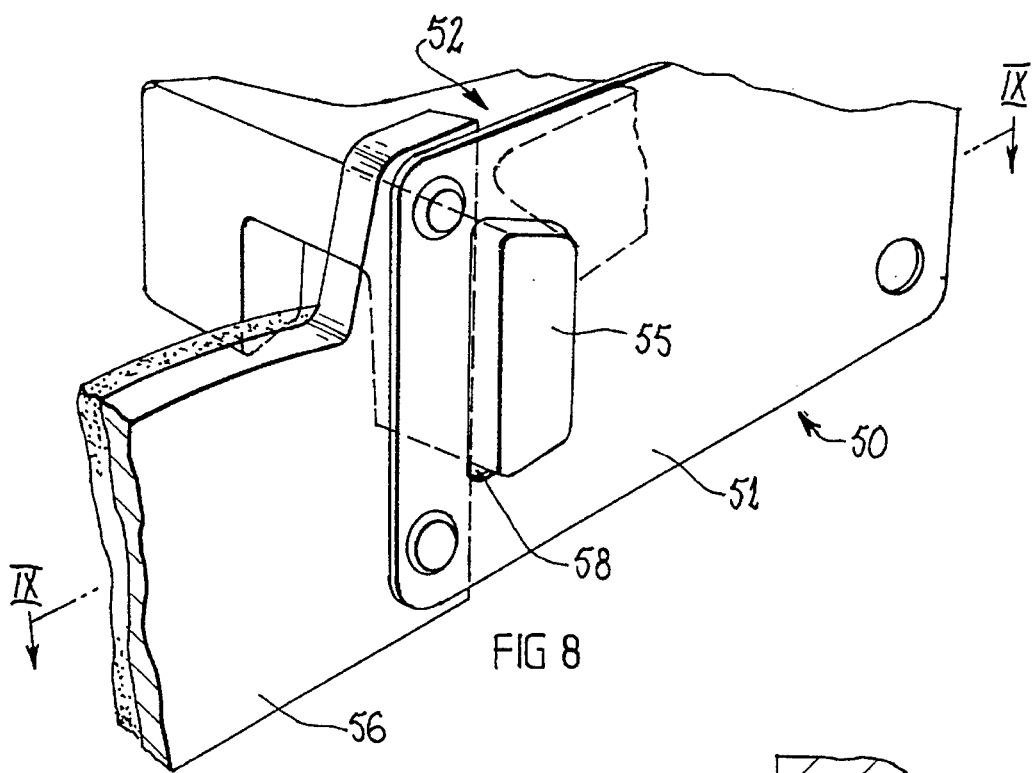
FIG. 8 shows in perspective view a mounting arm or strap according to yet another embodiment of the invention.
Figure 9:
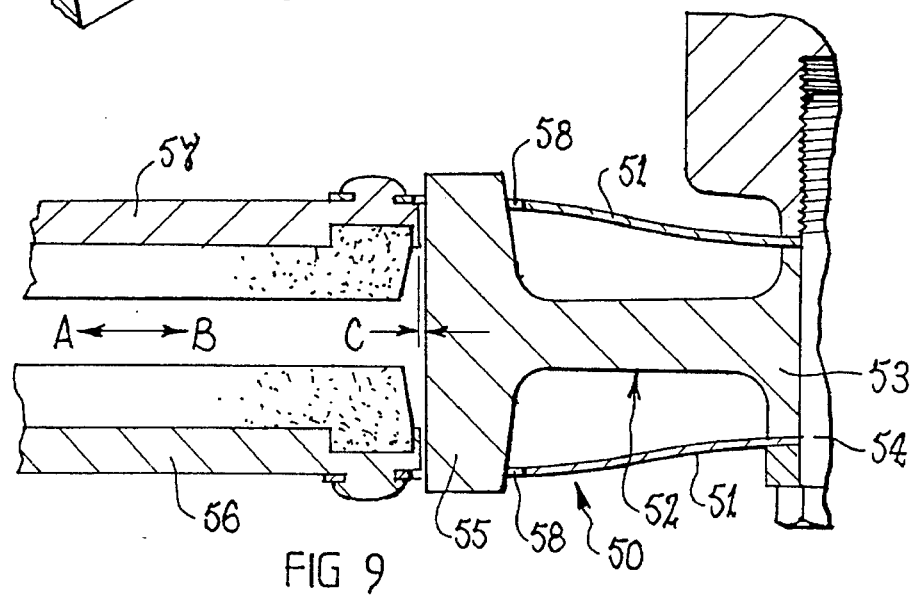
FIG. 9 is a cross-sectional view taken along line IX—IX of FIG. 8.

There are various ways of constructing a strap or arm which can resist deflection in both tension and compression. FIGS. 8 and 9 show such an arrangement which is different to that of FIGS. 6 and 7. In the arrangement of FIGS. 8 and 9, the mounting arm 50 is composed of two side plates 51 and a compression member 52 disposed between those plates 51. The outer end 53 of the compression member 52 may bear against a rigid support structure 54 as shown. The inner end of the member 52 forms an anvil 55 which is engageable with adjacent ends of the two pad assemblies 56 and 57. In the particular arrangement shown, the anvil 55 extends laterally through an aperture 58 provided in each of the plates 51.

Each plate 51 is secured at one end to the support structure 54 and is secured at its other end to a respective one of the pad assemblies 56 and 57. The plates 51 are therefore able to function as tension straps when the brake is applied while the disc (not shown) is rotating in the direction of arrow A (FIG. 9). Under those circumstances, a small clearance 'c' (FIG. 9) may exist between the anvil 55 and the adjacent ends of the pad assemblies 56 and 57. If the brake is applied while the disc is rotating in the direction of arrow B (FIG. 9), the plates 51 will tend to buckle under the resulting compressive load, but the pad assemblies 56 and 57 engage against the member 52 thereby preventing further buckling (deflection) of the plates 51.

Figure 10:
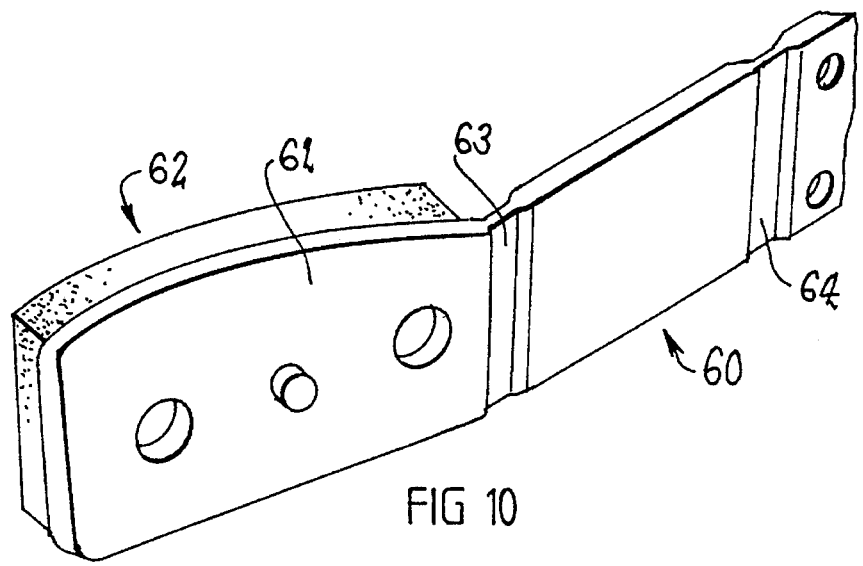
FIG. 10 is a perspective view of a pad assembly according to one embodiment of the invention.

FIG. 10 shows another embodiment of the invention in which a mounting strap or arm 60 is able to withstand deflection under both tension and compression. In the arrangement shown, the arm 60 is formed integral with a backing plate 61 of a brake pad assembly 62, and is of relatively heavy plate-like construction. The thickness of the arm 60 is reduced adjacent each end so as to form two zones of weakness 63 and 64, and those zones enable the arm 60 to deflect or flex as required for the pad assembly 62 to move towards and away from an associated disc.

The arm 60 operates in the manner previously described when subjected to tension. Because of its relatively heavy section, the arm 60 will also resist deflection or buckling when subjected to endwise compression. It may be necessary however, to provide side supports for the arm 60 to prevent it buckling excessively about either of the zone 63 and 64 when subjected to a compressive load.

A variation of the FIG. 10 arrangement may be adopted in a brake which is to be operative for one direction of rotation only. According to that variation, the arm 60 is of relatively thin sheet-like construction so as to have no substantial resistance to buckling under compression, but which will nevertheless operate as required under tension. Such an arm can be formed integral with a backing plate as shown in FIG. 10.

It will be apparent that the mounting arm in any of its various possible forms, can be attached to the brake pad assemblies in a number of different ways. The arrangements so far described involve direct connection of the arm with the pad backing plates, but that is not an essential requirement.

Figure 11:
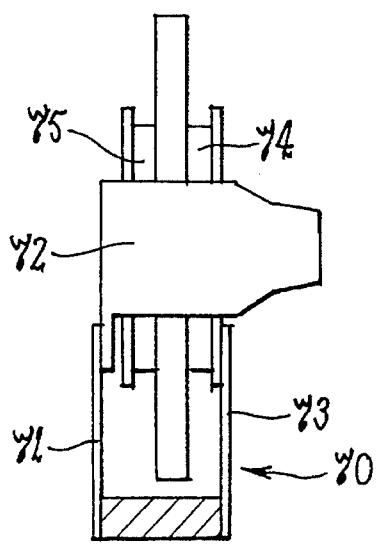
FIGS. 11 to 13 show in diagrammatic form some of the possible ways in which the mounting arm or strap can be attached to the pad assemblies.
Figure 12:
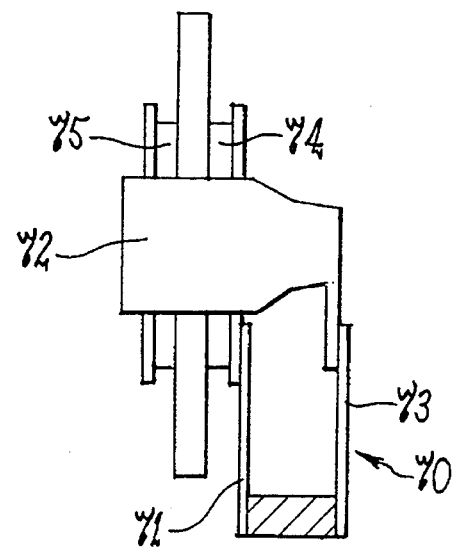
Figure 13:
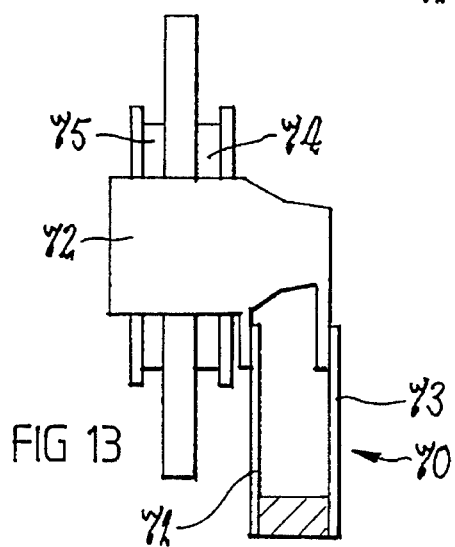

FIGS. 11 to 13 show some of the possible variations in the manner of attachment of the mounting arm to the pad assemblies. In FIG. 11, the arm 70 has one part 71 connected to the caliper housing 72, and another part 73 connected to a pad assembly 74. The other pad assembly 75 is therefore connected to the arm 70 through the caliper housing 72. FIG. 12 shows the reverse arrangement, of FIG. 11 in that the arm parts 71 and 73 are connected to the pad assembly 75 and the caliper housing 72 respectively. According to FIG. 13, both arm parts 71 and 73 are connected to the housing 72 and are therefore indirectly connected to the pad assemblies 74 and 75.

Any of the arrangements shown in FIGS. 11 to 13 could have two mounting arms as described, by way of example, with reference to FIG. 1. Also, in any situation involving the use of two mounting arms, the mounting arm on one side of the pad assemblies need not be the same as that on the other side.

Furthermore, it is not to be understood that the mounting arm shown in FIGS. 11 to 13 is necessarily limited to single direction braking. The arm could be constructed to operate satisfactorily for both forward and reverse direction braking.

Still further, any arrangement requiring a slip joint need not have that joint located at the pad assemblies as described in relation to FIGS. 2 to 4. A slip joint could be provided at the connection between a mounting arm and the support for that arm. Other suitable locations for the slip joint might be found.

It will be appreciated from the foregoing that the invention provides a simplified assembly which avoids the need for a separate anchor bracket to support the caliper and brake pads, In accordance with the present invention, the brake pads are connected directly to the vehicle by straps or arms which allow for brake pad movement whilst also directly transmitting the braking forces into a rigid part of the vehicle. It also eliminates the pad-to-anchor clearances traditionally provided in sliding brake pads and which are a source of vibration and corrosion.

Various modifications, alterations or additions may be made to the various embodiments described herein without departing from the spirit or ambit of the invention as defined by the appended claims.

I claim:

1. A disc brake assembly including a rotatable disc, a brake pad located on each of two opposite sides of the disc, a support located away from said pads in a direction transverse to the rotational axis of the disc, mounting means connecting said pads to said support and having an arm which extends between the pads and the support and holds the pads in an operative position relative to said support, said arm being composed of two parts, each of which is connected to a respective one of said pads, and each said part includes two straps which are arranged in substantially parallel spaced apart relationship, wherein each said arm part is deflectable in the general direction of said rotational axis to thereby permit each said pad to move towards and away from the respective adjacent side of the disc, and each said arm part is substantially resistant to deflection in at least one direction transverse to said rotational axis such that the pads are not caused to be moved out of said operative position by the load imposed on said arm as a consequence of said pads engaging the disc while the disc is rotating.

2. An assembly according to claim 1 wherein each said pad includes a backing plate and a section of friction material secured to that plate, and each said arm part is connected to said backing plate of the respective pad.

3. An assembly according to claim 1 wherein each said pad is connected to a caliper housing, and each said arm part is connected to the respective said pad through said caliper housing.

4. An assembly according to claim 1 wherein each said pad includes a backing plate and a section of friction material secured to that plate, and one said arm part is connected to the backing plate of one said pad and the other said arm part is connected to the other said pad through a caliper housing.

5. An assembly according to claim 1 wherein spacer means is located between the two said straps of each said arm part.

6. An assembly according to claim 5 wherein an abutment is connected to one end of each said arm part and another abutment is connected to the other end of each said arm part, and a rigid compression member is located between said straps and between said abutments so as to be engageable with the abutments to prevent said straps buckling under compressive forces.

7. An assembly according to claim 1 wherein vacant space exists between said two straps.

8. A pad assembly for use with a disc brake including a friction pad, and at least one mounting arm connected to said pad and extending laterally therefrom, said arm being formed of two straps arranged in substantially parallel spaced apart relationship and being connectable to a support so as to extend between the pad and the support, wherein said arm is deflectable in a direction such that the pad can be moved relative to said support towards and away from a brake disc with which the pad assembly is used, and said arm is substantially resistant to deflection in at least one direction transverse to the first said direction so that said pad is not caused to be moved out of an operative position relative to the disc of a disc brake when said pad assembly is in use and is subjected to load as a consequence of said pad engaging said disc while said disc is rotating.

9. A caliper for use with a disc brake assembly, including a housing containing a cylinder for slidably receiving a piston having a first friction pad assembly attached thereto, a bridge connected to said housing so as to extend generally in the direction of the cylinder axis and being attached to a second friction pad assembly, and at least one mounting arm connected to said housing and extending therefrom in a direction generally transverse to said axis, said arm being connectable to a support so as to extend between the housing and the support and thereby extend between said friction pad assemblies and the support, wherein said arm is deflectable in the general direction of said axis and is substantially resistant to deflection in at least one direction transverse to said axis so that said pad assemblies are not caused to be moved out of an operative position relative to the disc of a disc brake when said caliper is in use and is subjected to load as a consequence of said pad assemblies engaging said disc while said disc is rotating.

10. A disc brake assembly including a braking unit comprising a caliper and two pad assemblies, said caliper including a housing and a bridge connected to said housing, a cylinder formed within said housing, a piston slidably contained in said cylinder and having one of said pad assemblies attached thereto, the other said pad assembly being attached to said bridge so as to be in opposed relationship to the first said pad assembly, and a mounting arm connected to said braking unit and extending laterally therefrom in a direction transverse to the axis of said cylinder, wherein said arm has an end which is connectable to a support remote from said unit so that the arm extends between the support and the unit, and said arm is deflectable relative to said support in the general direction of said cylinder axis to allow said pad assemblies to move towards and away from respective opposite sides of a brake disc with which they are associated in use, and said arm is resistant to deflection in at least one direction transverse to said cylinder axis and functions in use to support said unit at an operative position relative to said support and said disc.

11. A disc brake assembly including a rotatable disc, a brake pad located on each of two opposite sides of the disc, a support located away from said pads in a direction transverse to the rotational axis of the disc, mounting means connecting said pads to said support and having an arm which extends between the pads and the support and holds the pads in an operative position relative to said support, said arm includes two straps arranged in spaced face to face relationship and a rigid compression member located between said straps, at least one of said straps being formed of sheet material, an abutment connected to one end of each said strap and another abutment connected to the other end of each said strap, and said compression member being located between said abutments so as to be engageable with the abutments to prevent said straps buckling under compressive forces, wherein said arm is deflectable in the general direction of said rotational axis to thereby permit each said pad to move towards and away from the respective adjacent side of the disc, and said arm is substantially resistant to deflection in directions transverse to said rotational axis such that the pads are not caused to be moved out of said operative position by the load imposed on said arm as a consequence of said pads engaging the disc while the disc is rotating.

12. An assembly according to claim 11 wherein the mounting means includes two further straps having a rigid compression member therebetween.

13. An assembly according to claim 11 wherein one said abutment is formed by said support and the other said abutment is formed by ends of two pad assemblies each of which includes a respective one of said pads, said compression member is secured to said support against movement relative thereto, and the relationship between said straps and said compression member is such that clearance exists between said compression member and pad assembly ends when said straps are under tension.

14. A disc brake assembly including a rotatable disc, a brake pad located on each of two opposite sides of the disc, a support located away from said pads in a direction transverse to the rotational axis of the disc, mounting means connecting said pads to said support and having an arm which extends between the pads and the support and holds the pads in an operative position relative to said support, and said arm includes at least one plate-like member having at least one zone of reduced thickness so as to form a line of weakness in the plate-like member, wherein said arm is deflectable about said line of weakness so as to move in the general direction of said rotational axis and thereby permit each said pad to move towards and away from the respective adjacent side of the disc, and said arm is substantially resistant to deflection in at least one direction transverse to said rotational axis such that the pads are not caused to be moved out of said operative position by the load imposed on said arm as a consequence of said pads engaging the disc while the disc is rotating.

15. An assembly according to claim 14 wherein one of said at least one zone of reduced thickness is provided adjacent said pads, and another of said at least one zone is provided adjacent said support.

16. An assembly according to claim 14 wherein there are two plate-like members and each is connected to a respective one of said pads.

17. An assembly according to claim 14 wherein each said pad includes a backing plate and a section of friction material secured to that plate, and said at least one plate-like member is formed integral with said backing plate.

18. A disc brake assembly including a rotatable disc, a brake pad located on each of two opposite sides of the disc, two supports each of which is located away from said pads in a direction transverse to the rotational axis of the disc so that said pads are located between said supports, mounting means connecting said pads to both said supports and having two arms each of which extends between the pads and a respective one of the supports so as to hold the pads in an operative position relative to said support, and a slip joint provided in said mounting means to permit extension of an effective length of said mounting means, wherein said effective length extends between two connections, one of said connections exists between one of said two supports and the adjacent arm, and the other of said connections exists between the other of said two supports and the respective adjacent arm, at least one of said arms is deflectable in the general direction of said rotational axis to thereby permit each said pad to move towards and away from the respective adjacent side of the disc, and said at least one arm is substantially resistant to deflection in at least one direction transverse to said rotational axis such that the pads are not caused to be moved out of said operative position by the load imposed on said at least one arm as a consequence of said pads engaging the disc while the disc is rotating.

19. An assembly according to claim 18 wherein said slip joint is provided at a connection between one of said arms and the said pads.

20. A disc brake assembly including a rotatable disc, a brake pad located on each of two opposite sides of the disc, a support located away from said pads in a direction transverse to the rotational axis of the disc, mounting means connecting said pads to said support and having an arm which extends between the pads and the support and holds the pads in an operative position relative to said support, each said pad including a backing plate and section of friction material secured to that plate, and one said arm is connected to the backing plate of one said pad and the other said arm is connected to the other said pad through a caliper housing, wherein said arm is deflectable in the general direction of said rotational axis to thereby permit each said pad to move towards and away from the respective adjacent side of the disc, and said arm is substantially resistant to deflection in at least one direction transverse to said rotational axis such that the pads are not caused to be moved out of said operative position by the load imposed on said arm as a consequence of said pads engaging the disc while the disc is rotating.

* * * * *